Sept. 19, 1961 R. A. RAMEY, JR Re. 25,038

MAGNETIC AMPLIFIER CONTROL CIRCUIT

Original Filed May 18, 1953 2 Sheets-Sheet 1

INVENTOR
ROBERT A. RAMEY, JR.

Sept. 19, 1961 R. A. RAMEY, JR Re. 25,038

MAGNETIC AMPLIFIER CONTROL CIRCUIT

Original Filed May 18, 1953 2 Sheets-Sheet 2

INVENTOR
ROBERT A. RAMEY, JR.

United States Patent Office

Re. 25,038
Reissued Sept. 19, 1961

25,038

MAGNETIC AMPLIFIER CONTROL CIRCUIT

Robert A. Ramey, Jr., 116 Clearview Drive, R.D. 1, Library, Pa.

Original No. 2,717,965, dated Sept. 13, 1955, Ser. No. 355,891, May 18, 1953. Application for reissue May 22, 1957, Ser. No. 661,564
22 Claims. (Cl. 307—88)
(Granted under Title 35, U.S. Code (1952), sec. 266)

Matter enclosed in heavy brackets [ ] appears in the original patent but forms no part of this reissue specification; matter printed in italics indicates the additions made by reissue.

This invention relates to trigger circuits and more particularly, to trigger circuits which utilize magnetic circuitry having saturable magnetic core components.

Heretofore, the design of trigger circuit or timing circuit devices has been restricted almost exclusively to the use of electronic vacuum tubes, especially where the purpose to be served necessitated devices having high speed response characteristics. The reservation of any field to the vacuum tube, however, is not without inherent disadvantages. Many industrial and military applications require the device, in addition to high speed response, to have a robust character, that it be durable, simple and reliable so as to be substantially free from maintenance, etc. In some instances mechanical shock and adverse electrical conditions may be such as to preclude the use of conventional vacuum tube circuits. To fulfill these requirements, the magnetic circuit has characteristics which are eminently suitable while additionally providing a device having complete conductive isolation of input and output circuits.

The primary limitation of the magnetic circuit, which has been responsible for the restricted application of magnetic devices, involves the relatively sluggish time response characteristics as compared with the vacuum tube. A more realistic approach to the mechanics of magnetic circuit operation has shown, however, that time responses of a half-cycle at the operating frequency are easily attained. A rigorous discussion of such high speed circuits may be found in my copending application, Serial No. 237,813 filed July 20, 1951, *now Patent No. 2,783,315,* for Magnetic Amplifier Control Circuit, and Serial No. 237,814 filed July 20, 1951, *now Patent No. 2,719,885,* for Magnetic Amplifier With High Gain and Rapid Response. A response time characteristic of the order alluded to will be entirely adequate for many purposes.

Another factor which is of importance in the design of electrical circuits for many applications is the limitation on the weight a given unit of equipment may have. A fair comparison of the relative weights of the vacuum tube circuit and the magnetic circuit reveals that for power output requirements over five watts one may expect the magnetic device to be lighter, even where the operating frequency of the magnetic device is relatively low. For magnetic devices operative at relatively high frequencies, the favorable weight differential increases.

Accordingly, it is an object of the present invention to provide a new trigger circuit which utilizes magnetic components.

Another object of the present invention is to provide a magnetic trigger circuit which exhibits a time response characteristic of the order of a half-cycle at the operating frequency.

A further object is to provide a trigger circuit of a rugged and simple nature from conventional components which renders the maintenance factor insignificant.

Still another object of the present invention is to provide a magnetic trigger or timing circuit which supplies a series of output pulses having a repetition rate of twice the alternating-current power frequency, the output pulses being initiated in response to an "on" trigger pulse and terminated by an "off" trigger pulse.

Other objects of the present invention will become apparent from the following detailed description when taken in conjunction with the drawings in which:

FIGURE 1b illustrates certain of the voltage waveforms which occur in, or are applied to the magnetic trigger circuit of FIGURE 1a;

FIGURE 2 is a schematic diagram of modified form of the magnetic trigger circuit illustrated in FIGURE 1a.

FIGURE 3 is a more detailed schematic diagram of the trigger pulse input circuit of the apparatus shown in FIGURE 1a.

Figure 1B:
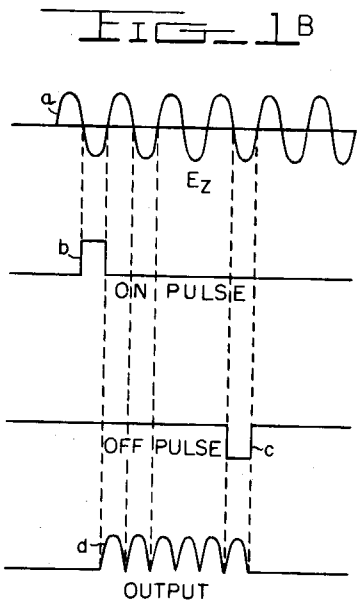

The underlying principles of the present invention are predicated on the theory that the magnetic circuit is a voltage sensitive device and it has been experimentally determined that the level of magnetization of a core of saturable magnetic material having high remanence (preferably square loop hysteretic characteristic) may be determined uniquely from the $$\text{Equation } e(\text{volts}) = -N\frac{d\phi}{dt}$$

or where the turns $N=1$, $\phi=-\int e dt$ volt-seconds. In other words, the time-integral of reactive voltage across the winding wound around a saturable magnetic core determines uniquely the magnetization level of the core. Thus, assuming a saturable core wherein the magnetization level is initially set at a given level, application of a voltage to the winding wound thereon causes the magnetization level to change in a sense determined by the polarity, and by an amount proportional to the time-integral, of the applied voltage. Should the time-integral of voltage be sufficient to cause the magnetization level to reach the saturation level of the core, further application of voltage of the same polarity will cause saturation, or output current to flow in the winding inasmuch as the saturable core device no longer presents a reactive voltage across the winding thereof in opposition to the applied voltage.

In view of the foregoing considerations the objects of the present invention are attained through the use of magnetic circuitry having two stable states of operation, the circuit being switched to one condition of operation by an "on" trigger pulse and to the other condition by an "off" trigger pulse. In general the circuit of the invention includes a pair of saturable magnetic cores having a high characteristic remanence; an alternating voltage magnetizing source and a voltage demagnetizing source for respectively causing the magnetization level of each core to be raised from a given level below saturation to the saturation level and reset from the saturation level to the given level, the magnetizing and demagnetizing voltages being respectively operative on each core in alternation such that while the magnetization level of one core is proceeding to the saturation level the magnetization level of the other is being depressed to the given level. The circuit is switched to the "on" condition by the application of a trigger pulse in opposition to the demagnetizing voltage whereby the magnetization level of the core that is being reset is caused to remain at the saturation level; in the ensuing half-cycle this core permits the magnetizing voltage to drive load current through the winding thereon as described hereinbefore. The load current passes through a series load impedance, the resultant voltage appearing thereacross is fed back in the circuit so as to tend to oppose any change in the magnetization level of the other core, which during this period of operation, would otherwise be reset at the given level. Thus the circuit is in a condition wherein the demagnetizing source is effectively disabled with the result that the magnetizing voltage may in each half-cycle thereof deliver load current to the load impedance. This circuit is switched to the other stable state of operation by an "off" trigger pulse, which pulse is fed in the circuit in opposition to the feed-back voltage. Cancellation of the feed-back voltage renders the demagnetizing voltage source effective again to reset the cores at the given level, the magnetizing voltage now being completely absorbed in raising the core magnetization levels to the saturation level and hence, output current no longer flows.

Figure 1A:
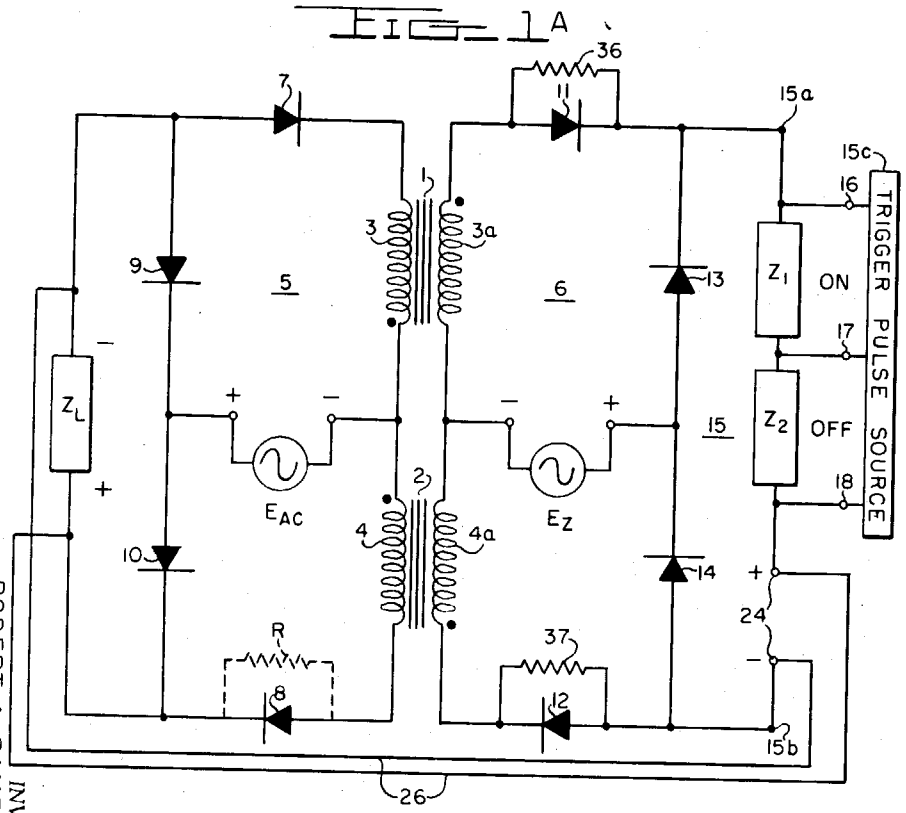
FIGURE 1a is a schematic diagram of a magnetic trigger circuit of the present invention.

FIGURE 1a illustrates a circuit embracing the principles of the present invention. As shown a pair of preferably identical, saturable magnetic cores 1 and 2, of high characteristic remanence, have wound thereon respective windings 3 and 4 which are included in an output circuit generally designated at 5. More specifically, output windings 3 and 4 are disposed in adjacent arms of a unilateral impedance bridge network comprised of unilateral impedance elements 7, 8, 9 and 10 which may typically be rectifiers. Connected across opposite junctions of the output impedance bridge is an alternating voltage source $E_{ac}$ which by virtue of the bridge network applies a half-cycle magnetizing voltage to windings 3 and 4 in alternation, voltage source $E_{ac}$ being hereinafter referred to as the magnetizing voltage. Connected across the other terminals of the output impedance bridge is a load impedance $Z_L$ which may represent the input impedance of the apparatus to be controlled by the trigger circuit.

Similar to the arrangement of output windings 3 and 4 in the output circuit, a pair of windings 3a and 4a are respectively wound on cores 1 and 2 and are included as elements of an input circuit generally designated at 6. Adjacent one end of each of the windings in FIGURE 1a are dots which refer to winding polarity. The input windings 3a and 4a are likewise disposed in adjacent arms of a unilateral impedance bridge network which is comprised of unilateral impedance elements 11, 12, 13 and 14, also shown as rectifiers. Connected across the opposing junctions of the input impedance bridge is an alternating voltage source $E_z$, hereinafter referred to as the demagnetizing or reset voltage, the impedance bridge again being arranged such that a half-cycle of demagnetizing voltage is applied to the input windings 3a and 4a in alternation. With regard to the interaction of the magnetizing and demagnetizing voltages on the respective input and output windings of each core, the input and output bridge circuits are arranged such that magnetizing voltage is applied to the output winding on one of the cores while demagnetizing voltage is applied to the input windings on the other core, for reasons which will become more apparent hereinafter. In addition, the magnetizing voltage $E_{ac}$ operating through the output rectifier bridge causes the cores 1 and 2 to shift their magnetization levels in one direction toward saturation, whereas demagnetization voltage $E_z$ operating through the input rectifier bridge causes the cores 1 and 2 to shift their magnetization levels in the opposite directions away from saturation.

Connected across the other pair of opposite junctions 15a and 15b of the input bridge network is a series signal input circuit, generally designated at 15, that includes impedance $Z_1$ and $Z_2$ which serve as means for introducing "on" and "off" trigger pulses b and c in FIGURE 1b, at terminals 16, 17 and 18, 17 respectively in the input circuit 6. The series circuit also includes terminals 24 to which is fed by lines 26 the output voltage developed across the output impedance $Z_L$. *Connected to terminals 16, 17, and 18 is a trigger pulse source 15–C which provides the "on" triggering pulse shown at b in FIG. 1B and the "off" trigger pulse shown at c in FIG. 1B.*

By virtue of the arrangement of the impedance networks in the form of bridge circuits, the voltage which appears across impedance $Z_L$ due to the magnetizing voltage $E_{ac}$ and the voltage exhibited at terminals 15a and 15b by demagnetizing voltage $E_z$ will be of constant polarity. In signal input circuit 6 the "on" trigger pulse b is applied to terminals 16, 17 and impedance $Z_1$, for the polarities indicated in FIGURE 1, as a positive pulse on terminal 16 relative to terminal 17 in opposition to the demagnetizing voltage $E_z$ appearing at terminals 15a and 15b. The feed-back voltage from impedance $Z_L$ is also applied as a positive voltage pulse at terminals 24, while the "off" trigger pulse c is fed in the signal input circuit as a negative pulse at terminal 17 relative to terminal 18 and hence will be in opposition to the feed-back voltage in the input circuit if such latter voltage is simultaneously exhibited therein, all for reasons to be more fully explained.

As thus connected the alternate operation of the magnetizing and demagnetizing voltage sources on cores 1 and 2 is had as follows: with the polarities as indicated in FIGURE 1a, exemplifying a positive or first half-cycle of voltage $E_{ac}$, current will flow from the positive terminal of source $E_{ac}$ to the negative terminal thereof through a path including rectifier 10, impedance $Z_L$, rectifier 7, and winding 3. Also during this half-cycle, current will flow from the positive to the negative terminal of source $E_z$ in the input circuit through a path including rectifier 13, signal input circuit 15, rectifier 12, and winding 4a. In a like manner during the next successive half-cycle of voltage $E_{ac}$, magnetizing voltage will be applied to winding 4 while demagnetizing voltage will be applied to winding 3a, current flowing through impedance $Z_1$ and signal input circuit 15 in the same sense as before. Referring again to the first half-cycle of operation, assuming the magnetization level of core 2 to be at the saturation level and the magnetization level of core 1 to be at a given level below saturation, the time-integral of magnetizing voltage applied to winding 3 by $E_{ac}$ should be set so as to be just sufficient to raise the magnetization level of core 1 from the given level to the saturation level, while in input circuit 6, the time-integral, of demagnetizing voltage coincidently applied to winding 4a should reset the magnetization level of core 2 to the given level. Under these conditions in the absence of an "on" trigger pulse the full time-integral of half-cycles of magnetizing voltage $E_{ac}$ is completely absorbed in raising the magnetization level of the cores 1 and 2 to saturation and thus, negligible voltage appears across the load impedance $Z_L$ with the result that essentially no feed-back voltage appears at terminals 24. This latter result permits full demagnetizing or reset voltage to be applied to the input windings for complete resetting thereof.

It should be apparent from the functions served by sources $E_{ac}$ and $E_z$ that the voltage output therefrom should be of the same frequency and phase and hence, may be derived from the same source as by transformer connections. In addition, where the turns ratio of the windings on the cores is unity, the magnitude of voltages $E_{ac}$ and $E_z$ may be substantially equal to one another and to the maximum value the cores 1 and 2 may absorb without saturating. Obviously the operating conditions of the trigger circuit will also be affected to a great extent by the magnetic characteristics of cores 1 and 2. A consideration of the desired operational characteristics will show the optimum magnetic core characteristic to be similar to the substantially rectangular loop type exhibited by materials such as Deltmax, Orthonol, etc. More particularly, the core materials should have a high characteristic remanence with relatively complete saturation at low levels of magnetomotive force.

In the operation of a trigger circuit such as shown in FIGURE 1a in the absence of an "on" trigger pulse the magnetizing and demagnetizing voltages cause the cores 1 and 2 to swing back and forth from the saturation level to the given level below saturation and negligible output current flows in the output circuit resulting in substantially zero voltage feed-back to terminals 24. A positive "on" trigger pulse applied at terminals 16, 17 to impedance $Z_1$ is exhibited as a voltage in the input circuit 6 in opposition to the demagnetizing voltage $E_z$. Assuming this voltage to coincide with a negative half-cycle of $E_z$, during which time core 2 would normally be reset and further that the trigger pulse is of a magnitude at least equal to $E_z$, the magnetization level of core 2 will not be shifted from the saturation level since the demagnetizing voltage has been effectively cancelled. Hence, in the ensuing half-cycle, due to the saturation of core 2, winding 4 will present no reactive voltage in opposition to magnetizing voltage $E_{ac}$ with the result that the full magnetizing voltage appears across load $Z_L$ through a circuit path including winding 4, rectifier 8, impedance $Z_L$, and rectifier 9. At the same time, in the input circuit 6 voltage $E_z$ has now changed polarity whereby core 1, through winding 3a, rectifier 11, signal input cricuit 15 and rectifier 14, would ordinarily be reset. However, due to the output voltage appearing across $Z_L$ being fed back at terminals 24 in opposition to demagnetizing voltage $E_z$, core 1 is prevented from being reset in a like manner as described above. The circuit is now in a stable condition of operation inasmuch as the magnetizing voltage $E_{ac}$ applied across the output impedance $Z_L$ is fed back at terminals 24 to oppose and effectively cancel demagnetizing voltage $E_z$. This results in the magnetization level of cores 1 and 2 being maintained at the saturation level which permits the magnetization voltage $E_{ac}$ to be applied to load $Z_L$, giving rise to a series of pulses of half-cycle duration at output impedance $Z_L$ as indicated at d in FIGURE 1b.

To switch, or trigger, the circuit to the second stable state of operation a negative "off" pulse is fed in at terminals 17, 18 to impedance $Z_2$ which thereby injects a voltage in signal input circuit 15 in opposition to feed-back voltage at terminals 24. The resultant cancellation of the feed-back voltage permits demagnetizing source $E_z$ to perform again its core resetting function. Thus, assuming core 1 is reset as a consequence of an "off" trigger pulse occurring in the core 1 reset half-cycle, in the next half-cycle the magnetizing voltage $E_{ac}$ is completely absorbed in raising the core 1 magnetization level whereby substantially zero current flows in the output circuit. Feed-back voltage at terminals 24 then disappears permitting demagnetizing source $E_z$ to demagnetize core 2. In the second stable state of operation, therefore, substantially zero output voltage appears across output impedance $Z_L$.

Figure 3:
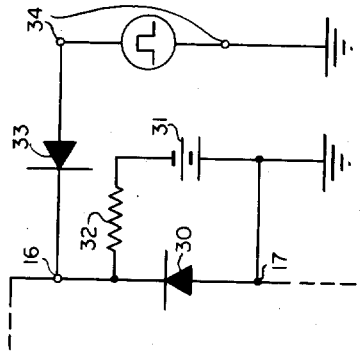

In order to permit the most efficient demagnetizing action as possible, it is preferable that a continuous low impedance path be provided for the demagnetizing current through the input circuit 6, and specifically through the signal input circuit 15. Accordingly, the means for inserting the trigger input signals in the input circuit must be such that, at terminals 16, 17 and 17, 18 in the absence of trigger pulses, a continuous low impedance path is provided. Thus, in FIGURE 3 a signal input circuit is shown which provides such a path either in the presence or absence of signals, for example, at terminals 16 and 17. Specifically in series across terminals 16 and 17 a unilateral impedance 30 is shown which is poled in opposition to the flow of demagnetizing current through the signal input series circuit 15. A constant current source including in series a direct current source 31 and high impedance 32, is connected across rectifier 30 and supplies to the trigger input circuit a small amount of current which is substantially constant and of a valve slightly greater than the demagnetizing current, source 31 being poled to supply current to signal input circuit 15 in the same direction as the flow of demagnetizing therethrough. The trigger pulse is applied at terminals 34 through rectifier 33 to terminal 16. As thus connected, in the absence of a trigger pulse at terminals 34 during demagnetizing operation, full demagnetizing current is permitted to flow in the input circuit 6 through the constant current source, the excess of current supplied by the constant current source over the required value of demagnetizing current flowing through rectifier 30. Upon application of a trigger pulse equal in magnitude and duration to a half-cycle of demagnetizing voltage, no demagnetizing current can flow in input circuit 6 because of the existence of the signal voltage therein across rectifier 30 in opposition to the demagnetizing voltage, the constant current now circulating through the input signal source.

Assumptions used in the foregoing description include: after saturation the residual flux in the magnetic core approaches the saturation value; and the rectifiers do not have leakage in excess of the magnetizing current of the cores. For the first assumption to hold true, obviously the core materials employed control the results obtained. When excessive rectifier leakage exists, exemplied by resistor R shown in broken lines in parallel with rectifier 8 in Figure 1a, the detrimental effect observed is a partial demagnetization of the cores by voltage $E_{ac}$ during the reset period when the demagnetizing path is blocked by an incoming trigger pulse. Such partial demagnetization is manifested by a less than complete output pulse ordinarily to be expected in the half-cycle succeeding the period of demagnetization circuit blocking. To more fully comprehend the nature of this effect, in relation to FIGURE 1a, consider the beginning of a half-cycle of magnetizing voltages $E_{ac}$, in which load current is to be driven through winding 3, core 1 at this time being at the saturation level. In the input circuit 6, demagnetizing voltage ordinarily would be applied to winding 4a, however, assuming that either an "on" pulse is being fed to impedance $Z_1$ or that feed-back voltage exists at terminals 24, demagnetizing voltage $E_z$ should be effectively cancelled with respect to winding 4a. If rectifier 8, however, is of relative poor quality, leakage current would flow in the path including source $E_{ac}$, rectifier 10, backwards through rectifier 8 and through winding 4, resulting in a demagnetizing flux being applied to core 2 which should normally, under the conditions set forth, remain at the saturation level. Hence in the next half-cycle of magnetization voltage $E_{ac}$, the partial demagnetization of core 2 will first have to be overcome before load current can flow in the path including source $E_{ac}$, winding 4, rectifier 8, load impedance $Z_L$, and rectifier 9. The time-integral of the magnetizing voltage required to saturate core 2, due to this partial demagnetization, will of course subtract directly from the time-integral of voltage applicable to load $Z_L$. At the same time rectifier 14 leakage current would also result in partial demagnetization of core 2.

There are, however, compensatory methods which may be utilized to overcome this detrimental effect. For example, compensation may be accomplished by purposely degrading rectifiers 11 and 12 in input circuit 6 by the addition of by-pass resistors 36 and 37. The addition of these by-pass resistors enables the demagnetizing voltage to assist the magnetizing voltage to overcome any partial demagnetization due to leakage currents. For example, if core 2 has been partially reset due to leakage current through rectifiers 8 or 14 or both in a given half-cycle, in the following half-cycle the polarity of sources $E_{ac}$ and $E_z$ now being reversed, before load current could pass through winding 4 the magnetizing voltage $E_{ac}$ would first have to overcome the partial demagnetization of core 2. With the provision of by-pass resistor 37, however, demagnetizing voltage $E_z$ is also applied to winding 4a in input circuit 6 by virtue of current flowing in the circuit path including winding 4a, resistor 37, and rectifier 14. It will be noted that source $E_z$ at this time is of polarity which assists the magnetizing voltage $E_{ac}$ to overcome the partial demagnetization of core 2. Another method of compensation would be to assure that the input trigger pulse, or the feed-back voltage, is somewhat greater in magnitude than the demagnetizing voltage $E_z$. In this case there would be a net voltage in the demagnetization circuit path of a polarity tending to cause leakage in the input circuit rectifiers in a direction which results in a voltage across either winding 3a or winding 4a of opposite polarity to the voltage across winding 3 or 4 due to leakage current in the output circuit.

Figure 2:
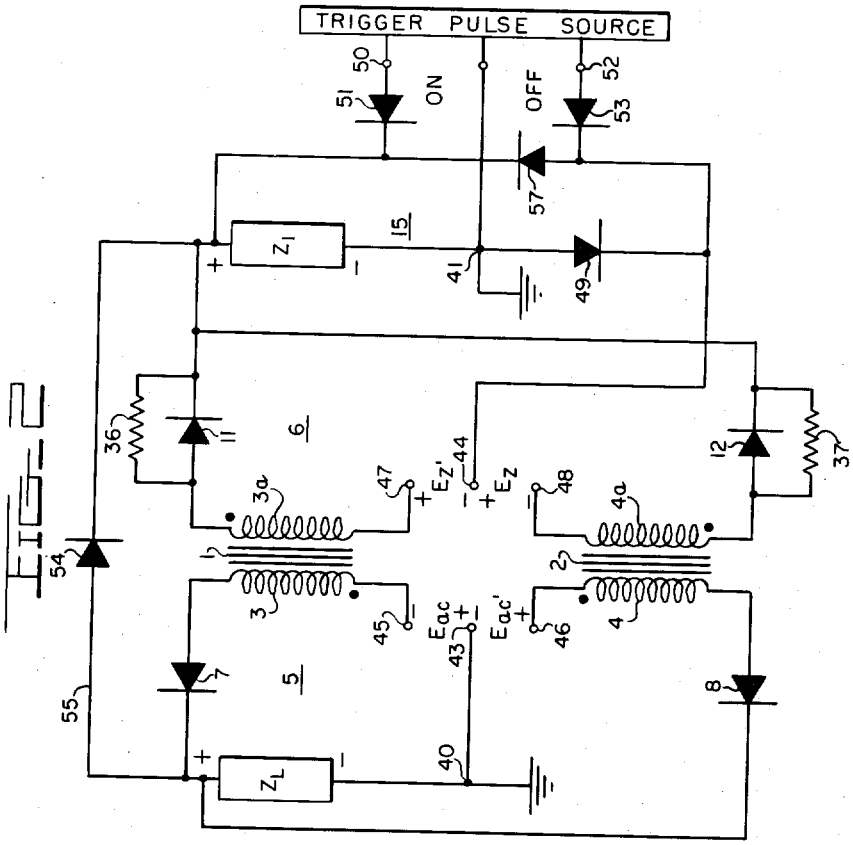

The circuit configuration illustrated in FIGURE 1a may be generally described as a bridge-connected trigger circuit. A modification thereof is illustrated in FIGURE 2, which shows a parallel connection for the trigger circuit, similar components bearing corresponding numerals. In the form of the circuit of FIGURE 2 operation is simplified by referencing all the potentials to ground as at terminals 40 and 41. The function of the various components of the parallel circuit of FIGURE 2 is similar to that of like elements shown in FIGURE 1a. However, both the magnetizing and the demagnetizing sources are center-tapped, the center-tap being connected to the ground terminals so that in the magnetizing and demagnetizing periods, only one-half of the voltage of the sources is applied to the associated windings. The alternate operation of the circuit is the same as described above, for example, in a given half-cycle of magnetizing source $E_{ac}$ the active part of the output circuit may be, for the polarity indicated in FIGURE 2, magnetizing voltage $E_{ac}$ at terminals 43 and 46, winding 4, rectifier 8 and load impedance $Z_L$. During the same half-cycle the active part of the input circuit includes demagnetizing voltage $E_z$ at terminals 47 and 44, winding 3a, rectifier 11, impedance $Z_1$ and rectifier 49. In the following half-cycle of magnetizing voltage, in the output circuit magnetizing voltage $E_{ac}$ at terminals 45 and 43 will be applied to winding 3 through rectifier 7, and demagnetizing voltage $E_z$ will be applied from terminals 48 and 44 to winding 4a, through rectifier 12, input impedance $Z_1$ and rectifier 49. The voltage feed-back path is supplied by line 55 and decoupling rectifier 54 whereby output voltage appearing across load impedance $Z_L$ is fed back to the input circuit. In the trigger pulse input circuit 15, the components are so arranged whereby both the "on" and "off" trigger pulses may be of positive polarity. Thus a positive on pulse at terminal 50 is fed through isolating rectifier 51 to the positive side of input impedance $Z_1$ in opposition to the demagnetizing voltage regardless of which circuit path is active. A positive "off" pulse at terminal 52 is fed through isolating rectifier 53 to terminal 56 at the back side of rectifier 49 which serves to maintain terminal 56 at a voltage above ground equal in magnitude to the "off" trigger pulse. It will be noted that a positive "off" pulse at terminal 56 will be opposite in polarity to the feed-back voltage which appears across input impedance $Z_1$. Operation of the circuit is substantially as described in connected with the FIGURE 1a.

It is preferred that in the trigger circuit of FIGURE 2, rectifier 57 be added between terminals 52 and the positive side of the input impedance $Z_1$. The addition of this rectifier prevents the possibility of excessive voltage being applied from terminal 52 to the active demagnetizing winding in the case where no feed-back voltage is present across impedance $Z_1$ and no pulse appears at the terminal 50. Rectifier 57 provides a counter-balancing voltage from terminal 52 to the positive side of impedance $Z_1$, which voltage is in opposition to the positive pulse at terminal 56. In the absence of such a connection it will be seen that any positive pulse at terminals 52 under the conditions stated, will add directly to the demagnetizing voltage being applied to the active winding, and if no counter-balancing potentials were provided, an overloading of that winding may result.

Generally, the foregoing description relates to magnetic trigger circuits which can be switched by signal pulses to either one of two stable states. However, it will be noted that the magnetic device remains essentially an amplifier, and hence, the pulse power needed for switching remains a very small fraction of a pulse power available from the trigger circuit. In addition, the trigger circuit is characterized by fast response, that is, an output is manifested in the output circuit after a time delay of at most one half-cycle of the excitation frequency. Further, contrary to prior magnetic devices, there is in this circuitry no exponential-like rise of output, but rather, full output is attained immediately following the aforesaid time delay.

In describing the operation of the trigger circuits of the present invention, the incoming trigger pulses have been assumed to be substantially equal in duration, magnitude and in phase with a half-cycle of demagnetizing voltage $E_z$. When these conditions are met, the series of output pulses from the trigger circuit is similar in form to full-wave rectification of alternating voltage source $E_{ac}$. Such a circuit would therefore be of greatest utility in a system wherein the input and output signals may be expected to occur at defined periods in a programmed series of events, for example, as in a computer system. It is not necessary, however, to the operability of the circuit that the above conditions be imposed. For example, the "on" trigger pulse may be random and of any shape and magnitude, in which case the series output pulses will have a magnitude proportional to the time-integral of the "on" pulse that overlaps in time the waveform of voltage $E_z$. In addition the only requirement for the "off" pulse is that it must have a time-integral value equal to voltage $E_z$ for complete cut-off of output from the trigger circuit.

Although the specific embodiments shown and described herein are preferred many modifications and variations may be made by those skilled in the art without departing from the spirit of the present invention which is not to be limited except insofar as is necessary by the scope of the disclosure.

The invention described herein may be manufactured and used by or for the Government of the United States of America for governmental purposes without the payment of any royalties thereon or therefor.

What is claimed is:

1. A magentic trigger circuit comprising a pair of saturable magnetic cores, magnetizing means operative to apply a magnetizing force to said cores successionally, demagnetizing means operative to apply a demagnetizing force to said cores successionally and to each core in alternation with said magnetizing means, means responsive to the application of a first triggering pulse to said circuit to render said demagnetizing means ineffective thereby permitting said magnetizing means to saturate said cores, and means responsive to the application of a second triggering pulse to said circuit to re-establish said demagnetizing means effective in said circuit.

2. A magnetic trigger circuit comprising a pair of high remanence saturable magnetic cores, magnetization control means including an alternating voltage supply source for raising the magnetization level of said pair of cores in alternation to the saturation level, demagnetization control means for depressing the magnetization level of said pair of cores in alternation to a given level below the saturation level, said magnetization and demagnetization means being respectively operative on each of said cores in alternation, means operative in response to a first trigger pulse to render said demagnetizing means ineffective thereby to permit said magnetization means to saturate said cores, and means responsive to a second trigger pulse to re-established said demagnetization means effective in said circuit.

3. A magnetic trigger circuit comprising a pair of suitable magnetic cores, magnetizing means operative to apply a magnetizing force to said cores successionally, demagnetizing means operative to apply a demagnetizing force to said cores successionally and to each core in alternation with said magnetizing means, means in said circuit operative in response to the application of a first triggering pulse thereto to reduce the effectiveness of said demagnetizing means for a period substantially equal to the duration of said pulse thereby to permit said magnetizing means to saturate at least one of said cores, means responsive to saturation of said one core to maintain said demagnetizing means ineffective, and means responsive to the application of a second triggering pulse to said circuit to render said last-named means ineffective.

4. A magnetic trigger circuit comprising a pair of saturable magnetic cores, a trigger pulse input circuit and an output circuit, magnetizing means in said output circuit for magnetizing said cores successively, demagnetizing means in said input circuit for demagnetizing said core successively and being operative on each core in alternation with said magnetizing means, feed-back means from said output circuit to said input circuit effective upon saturation of one of said cores to provide a force in said input circuit in opposition to said demagnetizing means thereby to reduce the demagnetization of the other of said cores, means in said trigger circuit responsive to the application of a first trigger pulse thereto to cause saturation of at least one of said cores, and means in said trigger circuit responsive to the application of a second trigger pulse thereto to render said feed-back means ineffective.

5. A magnetic trigger circuit comprising a pair of saturable magnetic cores, an output and an input winding wound on each of said cores, magnetizing and demagnetizing alternating voltage sources of substantially the same frequency and phase coupled to said output and input windings respectively, means for blocking the application of said magnetizing source to alternate output windings in successive half-cycles and for blocking the application of said demagnetizing source to alternate input windings in successive half-cycles, said sources being respectively applied to the windings on each of said cores in alternation, means operative in response to the application of a first trigger pulse to said circuit to reduce said demagnetizing voltage applicable to said input windings thereby to cause said magnetizing voltage to saturate said cores, and means responsive to the application of a second trigger pulse to said circuit to restore the full value of said demagnetizing voltage to said input windings.

6. A magnetic trigger circuit comprising a pair of saturable magnetic cores, an output and an input winding wound on each of said cores, alternating voltage magnetizing and demagnetizing sources of substantially the same frequency and phase coupled to said output and input windings respectively, unilateral impedance means for blocking the application of said magnetizing source to alternate output windings in successive half-cycles and for blocking the application of said demagnetizing source to alternate input windings in successive half-cycles, said sources being respectively applied to the windings on each of said cores in alternation, means for applying a first trigger pulse to said circuit in opposition to said demagnetizing voltage source to reduce the value thereof applicable to said input windings thereby to cause said magnetizing voltage to saturate said cores, and means responsive to the application of a second trigger pulse to said circuit for restoring the full value of said demagnetizing voltage to said input windings.

7. A magnetic trigger circuit comprising a pair of saturable magnetic cores, an output and an input winding wound on each of said cores, alternating voltage magnetizing and demagnetizing sources of substantially the same frequency and phase coupled to said output and input windings respectively, unilateral impedance means for blocking the application of said magnetizing source to alternate output windings in successive half-cycles and for blocking the application of said demagnetizing source to alternate input windings in successive half-cycles, said sources being respectively applied to the windings on each of said cores in alternation, feed-back means for supplying at least part of said magnetizing voltage in opposition to the application of said demagnetizing voltage to said input windings upon saturation of either of said cores, means for applying a first trigger pulse to said circuit in opposition to said demagnetizing voltage source to reduce the value thereof applicable to said input windings thereby to cause said magnetizing voltage to saturate at least one of said cores, and means for applying a second trigger pulse to said circuit in opposition to said feed-back voltage to restore the full value of said demagnetizing voltage to said input windings.

8. A magnetic trigger circuit comprising a pair of saturable magnetic cores each having an output and an input winding wound thereon; an input circuit; and an output circuit; said output circuit including said output windings, an alternating voltage magnetizing source coupled to said output windings, first unilateral impedance means for blocking the application of said source to alternate output windings in successive half-cycles, and a load impedance coupled to said source through said unilateral impedance means so as to receive unidirectional pulses therefrom; and said input circuit including said input windings, an alternating voltage demagnetizing source coupled to said input windings, second unilateral impedance means for blocking the application of said source to alternate input windings in successive half-cycles, said first and second unilateral impedance means being arranged to block said magnetizing and demagnetizing sources from the respective windings on each of said cores in alternation, feedback means for supplying from said output circuit the load impedance output voltage in opposition to said demagnetizing source, trigger pulse input means for applying a first trigger pulse to said input circuit in opposition to said demagnetizing source and a second trigger pulse in opposition to said feedback voltage.

9. A magnetic trigger circuit comprising a pair of saturable magnetic cores each having an output and an input winding wound thereon; an input circuit and an output circuit; said output circuit including a first unilateral impedance bridge circuit having said output windings disposed in adjacent arms thereof, an alternating voltage magnetizing source connected across opposite junctions of said bridge for applying a voltage to alternate output windings in successive half-cycles, and a load impedance coupled to said source through said bridge circuit so as to receive unipolar pulses therefrom; and said input circuit including a second unilateral impedance bridge circuit having said input windings disposed in adjacent arms thereof, an alternating voltage demagnetizing source connected across opposite junctions of said input bridge circuit for applying a voltage to alternate input windings in successive half-cycles, said demagnetizing and magnetizing sources applying voltage to the respective windings on each of said cores in alternation, feed-back means for supplying from said output circuit the load impedance output voltage in opposition to said demagnetizing source, and trigger pulse input means for applying a first trigger pulse to said input circuit in opposition to said demagnetizing source and a second trigger pulse in opposition to said feedback voltage.

10. A magnetic trigger circuit comprising a pair of saturable magnetic cores each having an output and an input winding wound thereon; an output circuit and an input circuit; said output circuit including said output windings, an alternating voltage magnetizing source coupled to said output windings, first rectifier means in series with said output windings and said magnetizing source for blocking the application of magnetizing voltage to alternate output windings in succesive half-cycles, and a load impedance coupled to said magnetizing source through said rectifier means so as to receive unipolar pulses therefrom; and said input circuit including said input windings, an alternating voltage demagnetizing source coupled to said input windings, second rectifier means in series with said input windings and said demagnetizing source for blocking the application of demagnetizing voltage to alternate input windings in successive half-cycles, said first and second rectifier means being arranged to block said magnetizing and demagnetizing voltages from the respective windings on each of said cores in alternation, feed-back means for supplying from said output circuit the load impedance output voltage in opposition to said demagnetizing voltage, and trigger pulse input means for applying a first trigger pulse in opposition to said demagnetizing voltage and a second trigger pulse in opposition to said feed-back voltage.

11. A magnetic trigger circuit comprising a pair of saturable magnetic cores each having an output and an input winding wound thereon; an output circuit and an input circuit; said output circuit including said output windings, an alternating voltage magnetizing source coupled to said output windings, first rectifier means in series with said output windings and said magnetizing source for blocking the application of magnetizing voltage to alternate output windings in successive half-cycles, and a load impedance coupled to said magnetizing source through said rectifier means so as to receive unipolar pulses therefrom; and said input circuit including said input windings, an alternating voltage demagnetizing source coupled to said input windings, second rectifier means in series with said input windings and said demagnetizing sources for blocking the application of demagnetizing voltage to alternate input windings in successive half-cycles, said first and second rectifier means being arranged to block said magnetizing and demagnetizing voltage from the respective windings on each of said cores in alternation, feed-back means for supplying from said output circuit the load impedance output voltage in opposition to said demagnetizing voltage, trigger pulse input means for applying a first trigger pulse in opposition to said demagnetizing voltage and a second trigger pulse in opposition to said feed-back voltage, and rectifier leakage compensation means in series with said demagnetizing source and said input windings for compensating for the reverse current flow through said rectifier means.

12. A magnetic trigger circuit substantially as set forth in claim 11 wherein said compensation means comprises a bilateral impedance means in parallel with said second rectifier means.

13. A magnetic trigger circuit comprising a pair of saturable magnetic cores each having an output and an input winding wound thereon; an input circuit and an output circuit; said output circuit including a first unilateral impedance bridge circuit having said output windings disposed in adjacent arms thereof, an alternating voltage magnetizing source connected across opposite junctions of said bridge for applying a voltage to alternate output windings in successive half-cycles, and a load impedance coupled to said source through said bridge circuit so as to receive unipolar pulses therefrom; and said input circuit including a second unilateral impedance bridge circuit having said input windings disposed in adjacent arms thereof, an alternating voltage demagnetizing source connected across opposite junctions of said input bridge circuit for applying a voltage to alternate input windings in successive half-cycles, said demagnetizing and magnetizing sources applying voltage to the respective windings on each of said cores in alternation, feed-back means for supplying from said output circuit the load impedance output voltage in oppositon to said demagnetizing source, trigger pulse input means for applying a first trigger pulse to said input circuit in opposition to said demagnetizing source and a second trigger pulse in opposition to said feed-back voltage, and leakage current compensation means in said second bridge circuit for compensating for reverse current flow through said unilateral impedance bridges.

14. A magnetic trigger circuit substantially as set forth in claim 13 wherein said compensation means comprises bilateral impedance means in parallel with the unilateral impedances in the second bridge circuit arms including said input windings.

15. Apparatus for initiating a series of pulses in response to a first applied pulse and terminating said series of pulses in response to a second applied pulse comprising a saturable core reactor, terminal means for coupling an alternating voltage source in series with said reactor, means responsive to said first pulse for saturating said reactor thereby to permit said source to supply voltage pulses through said reactor, and means responsive to said second pulse for desaturating said reactor.

16. Apparatus for initiating a series of pulses in response to a first applied pulse and terminating said series of pulses in response to a second applied pulse comprising a saturable core reactor, terminal means for coupling an alternating voltage source in series with said reactor, means responsive to said first pulse for initially saturating said reactor, means responsive to saturation of said reactor to cause said source to maintain said reactor saturated thereby to permit said source to supply voltage pulses through said reactor, and means responsive to said second pulse to render said last-named ineffective resulting in desaturation of said reactor.

17. Apparatus for initiating and terminating power flow from an alternating voltage source to a load impedance in response to first and second pulses respectively comprising a saturable core reactor, said load impedance being in series with said reactor, terminal means for coupling said alternating voltage source in series with said reactor and said load impedance, means responsive to said first pulse for saturating said reactor thereby to permit said source to supply power through said reactor to said load impedance, and means responsive to said second pulse for desaturating said reactor.

18. In a magnetic amplifier circuit wherein a load circuit is to be energized from a source of alternating voltage, the combination comprising, a high remanent saturable core reactor means adapted to couple the source of alternating voltage to the load circuit, means adapted to apply a magnetizing and then a demagnetizing voltage to said saturable core reactor means in periodic alternation, and a control circuit means connected to the reactor means and operative to interrupt the application of the demagnetizing voltage to said saturable reactor means for a predetermined period of time thereby permitting the magnetizing voltage to cause saturation of the saturable core reactor and the delivery of the alternating voltage to the load circuit during said predetermined period of time.

*19. In combination, saturable means, a load circuit adapted to saturate said saturable means, a control circuit adapted to reset said saturable means, and means for feeding back a portion of the load current flowing in said load circuit to said control circuit in a direction to oppose said control circuit resetting said saturable means.*

*20. In combination, saturable means, a load circuit adapted to saturate said saturable means, a control circuit adapted to reset said saturable means, and means for feeding back a portion of the load current flowing in said*

*load circuit to said control circuit in a direction to prevent said control circuit from resetting said saturable means in accordance with the output of said load circuit.*

*21. In combination, saturable means, a load circuit adapted to saturate said saturable means, a control circuit adapted to reset said saturable means, means for feeding back a portion of the current flowing in said load circuit in a direction to oppose said control circuit resetting said saturable means, and a trigger circuit adapted to aid in saturating and desaturating said saturable means.*

*22. In a multivibrator, a load circuit comprising a plurality of load windings, rectifier means in circuit with each said load winding, a plurality of control windings, rectifier means in circuit with each said control winding,*

*an alternating power source adapted to energize said load windings, an alternating voltage source of the same frequency as said power source adapted to energize said control windings, and unidirectional feedback means from the output of said load windings connected to oppose said alternating voltage source.*

References Cited in the file of this patent or the original patent

UNITED STATES PATENTS

| | | |
|---|---|---|
| 2,519,513 | Thompson | Aug. 22, 1950 |
| 2,524,154 | Wood | Oct. 3, 1950 |